Figure 11:
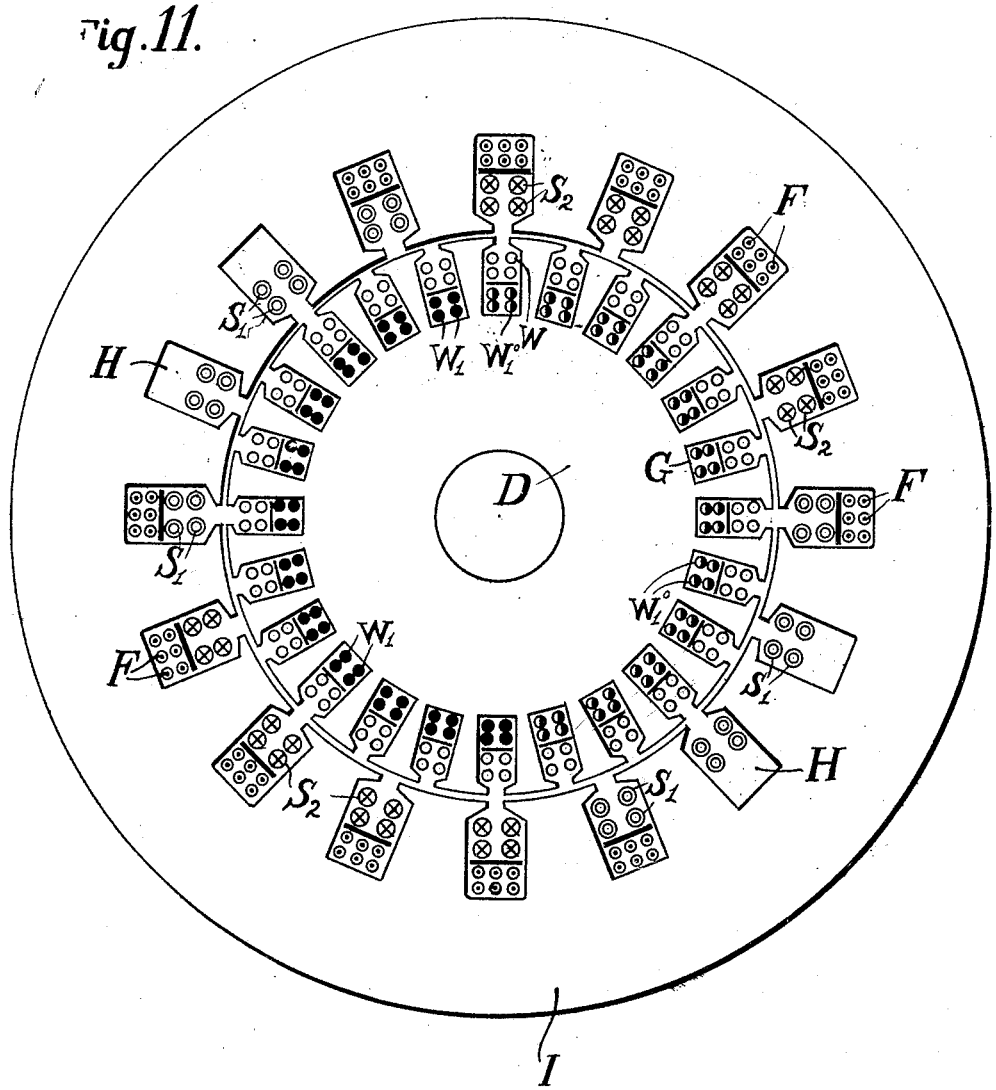

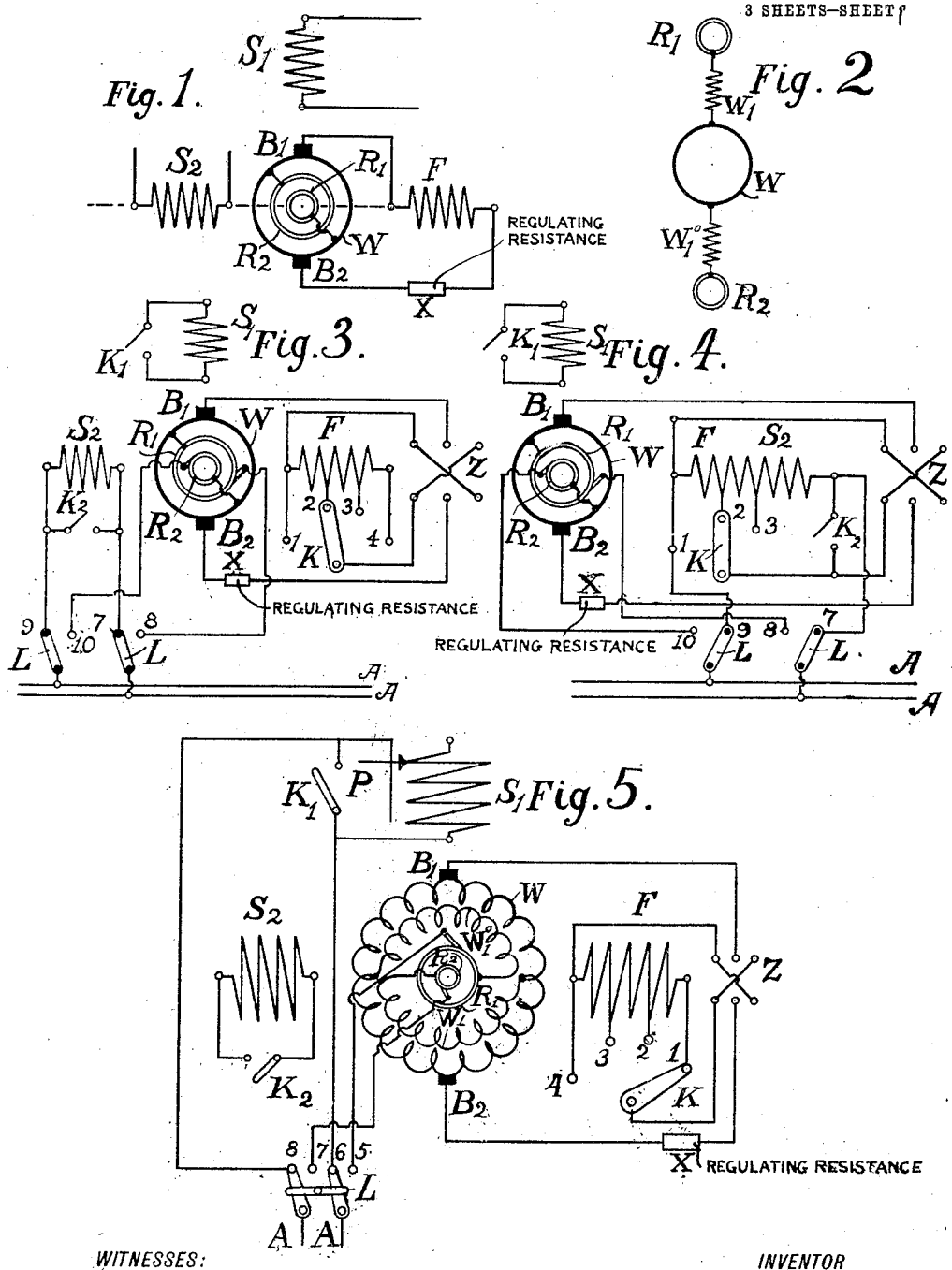

V. A. FYNN.
GENERATOR, CONVERTER, AND ALTERNATE CURRENT MOTOR.
APPLICATION FILED MAY 8, 1907.
1,068,494.
Patented July 29, 1913.
3 SHEETS—SHEET 2.
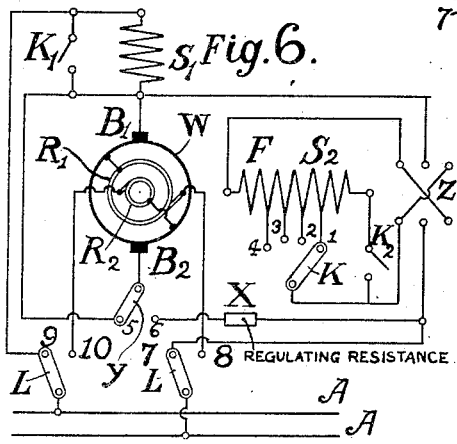
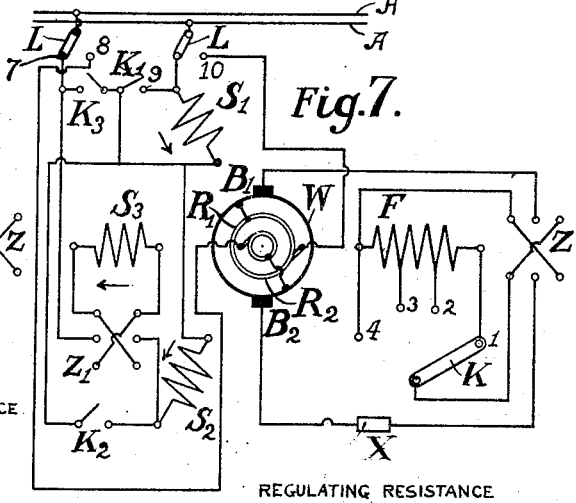
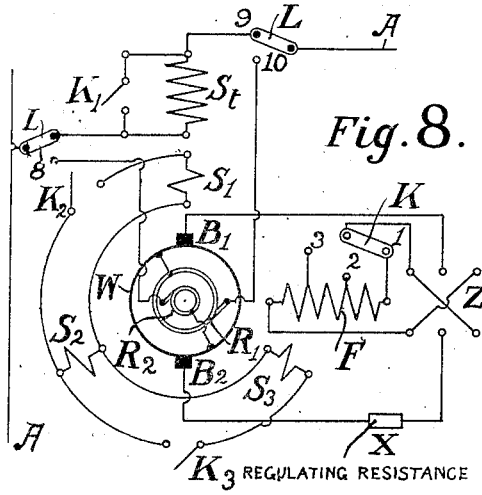
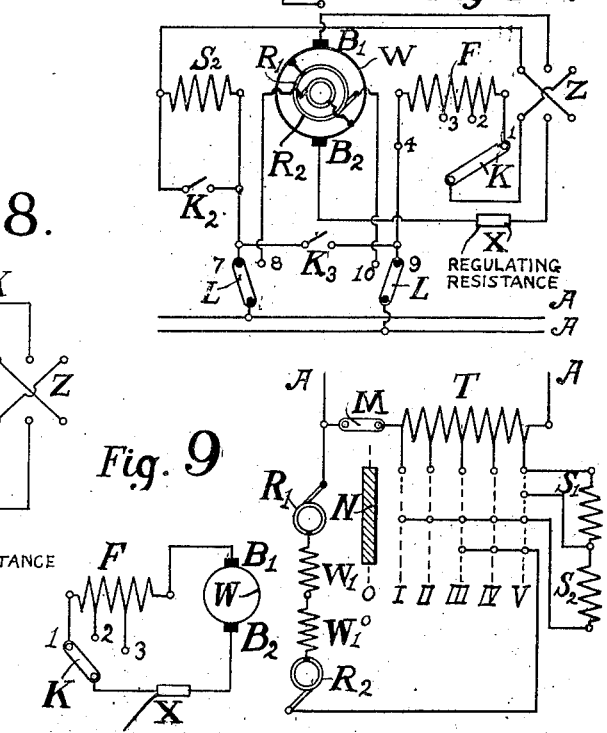
WITNESSES:
L. L. Mead
W. A. Alexander
INVENTOR
Valère A. Fynn
BY
Fowler & Huffman
ATTORNEYS

UNITED STATES PATENT OFFICE.

VALÈRE ALFRED FYNN, OF BLACKHEATH, ENGLAND.

GENERATOR, CONVERTER, AND ALTERNATE-CURRENT MOTOR.

1,068,494.  Specification of Letters Patent.  Patented July 29, 1913.

Application filed May 8, 1907. Serial No. 372,516.

*To all whom it may concern:*

Be it known that I, VALÈRE ALFRED FYNN, of 18 Blessington road, Blackheath, in the county of Kent, England, electrical engineer, have invented certain new and useful Improvements in Generators, Converters, and Alternate-Current Motors, of which the following is a specification.

My invention relates to a machine capable of being operated as an alternate current motor or generator and particularly suitable for operation as a single phase rotary converter.

The objects of my invention are to provide a motor which will start with a powerful torque and will run with a high power factor when operated from a single phase supply, or a machine which while operated as a converter, *i. e.*, as a combined motor and generator may be started with ease and with very little current from the alternating side and will be free from "hunting" and sparking. I achieve these objects by combining in one and the same machine the hereinafter defined features or constructive elements of an asynchronous and of a synchronous alternate current machine. When my machine is operating as a motor the asynchronous or synchronous features only or the combination of the asynchronous and the synchronous features are made use of in order to start the motor with ease while in normal operation the synchronous features are made use of to improve the power factor, the non-synchronous features being made use of to obviate all possibility of hunting and also to increase the overload capacity for their presence makes it possible for the machine to also work asynchronously. When such a machine is operating as a generator the non-synchronous features greatly simplify the paralleling and the parallel running while the synchronous features provide the self-excitation. When such a machine is operating as a converter, that is, a combined motor and generator, the asynchronous or synchronous features only, or a combination of the asynchronous with the synchronous features are made use of to start the machine with ease, while in normal operation the asynchronous features are made use of to avoid all possibility of hunting and also to increase the overload capacity, the synchronous features being made use of either to improve and to regulate the power factor or to regulate the voltage of the continuous current or generator side or for both purposes.

The more detailed descriptions of my invention will all refer to two pole machines when nothing to the contrary is stated, but it will be understood that this invention is applicable to machines with any number of poles.

My invention will perhaps be more easily understood by reference to the accompanying drawings, in which,—

Figure 1 shows the general disposition of circuits of a machine constructed according to this invention and capable of operating as a single phase motor, generator or converter. Fig. 2 shows a form of rotor winding particularly well suited for use in a single phase motor. Fig. 3 shows the arrangement of circuits and switches for starting a single phase motor as a shunt conduction machine and operating it as a self-excited synchronous motor also capable of running as an asynchronous machine or as a converter. Fig. 4 shows a modification of Fig. 3 in which part of the polyphase stator winding is combined with that winding which in normal operation provides the exciting field. Fig. 5 shows the arrangement of circuits and switches for starting a single phase motor as a self-excited series induction motor and operating it as indicated in connection with Fig. 3. Fig. 6 shows the arrangement of circuits and switches for starting a single phase motor as a separately excited series induction motor and operating it as indicated in connection with Fig. 3. Fig. 7 shows the arrangement of circuits and switches for starting a single phase motor partly as a separately and partly as self-excited series induction motor and operating it as indicated in connection with Fig. 3. Fig. 8 shows a modification of Fig. 5. Fig. 9 shows the arrangement of connections between a transformer, a motor similar to that shown in Fig. 7 and a multi-point starter. Fig. 10 shows the arrangement of circuits and switches for starting the machine as a series conduction motor and operating it as indicated in connection with Fig. 3. Fig. 11 shows the preferred stator and rotor construction.

One way of carrying the invention into practice consist broadly in suitably combining with a rotor connected to the alternate current supply by means of slip rings, a field structure of the stator type, that is one without defined polar projections, further in providing means for suitably exciting the machine from the rotor, and also providing means which will enable the machine to operate as a non-synchronous alternate current motor.

In applying my invention to a single phase alternating current motor also capable of operating as a converter, I provide the rotor as shown in Fig. 1 of the drawings with an ordinary continuous current winding W connected on one side to a commutator in the usual way, while two suitably chosen points of the same winding are connected to two slip rings $R_1$ $R_2$ on the other side. I also provide a laminated field structure of the stator type and two sets of windings thereon preferably embedded in slots provided in the stator. The one winding F is arranged to be connected to the brushes $B_1$ $B_2$ bearing on the commutator, the other $S_1$ $S_2$ is preferably of a polyphase type and arranged to be either connected to the supply or short-circuited on itself.

The asynchronous and synchronous features or constructive elements which are combined in these improved machines and which are referred to in the description as well as in the claims may be defined as follows:

The asynchronous features or constructive elements consist of—

1. A stationary member in the form of what is known as a stator or a laminated magnetic structure without defined polar projections.

2. A revolving member in the form of what is known as a rotor or a laminated magnetic structure without defined polar projections.

3. One member carrying windings adapted to receive alternate currents, either single or polyphase, through a suitable number of slip rings or otherwise.

4. The other member carrying polyphase windings adapted to be short-circuited. This member may, for instance, carry a three-phase winding, that is, one comprising three windings displaced by $240/n$ degrees, which may be interconnected or not or, it may carry a two-phase winding interconnected or not, but displaced by $180/n$ degrees, and so on. The letter "n" stands throughout for the number of poles of the machine.

The synchronous features or constructive elements consist of,—

5. A winding disposed on at least one member and adapted to produce, at least at synchronous speeds, a unidirectional magnetization (in respect of that member on which it is disposed) by means of continuous current sent through it and usually derived from the machine itself.

6. A commutator connected to the whole or to part of the windings disposed on one member in conjunction with brushes bearing on said commutator which brushes may be connected to the windings specified under (5), to an external load or to both.

For the sake of convenience these various features will in future be referred to by the numbers under which they are specified. They are of course subject to slight modifications as will hereinafter be pointed out.

Where rotor windings of the continuous current type are made use of they will be represented by a circle which may stand for the usual Gramme ring type of winding and where brushes are used it will be supposed that these bear directly on this Gramme ring winding although in practice a commutator will of course be used.

I will now describe with the help of Fig. 3 how a single phase motor constructed according to this invention may be started as a "shunt conduction motor" (neutralized or not).

The mains indicated by A A are connected by way of switches L to the stator winding $S_2$ disposed coaxially with F. The brushes $B_1$ and $B_2$ are connected to the winding F. The stator winding $S_1$ which is displaced by $180/n$ degrees (where n stands for the number of poles of the machine) from $S_2$ is short-circuited or not as may be desired; if it is short-circuited the rotor ampere turns along the axis of the brushes are partly neutralized.

The alternating E. M. F. applied to $S_2$ sets up an alternating field along the axis of F and induces therein a secondary E. M. F. which is impressed on the rotor by way of the brushes $B_1$ $B_2$. If the rotor ampere turns are not neutralized the rotor will have a large self-induction and the current due to the secondary E. M. F. will lag considerably behind the latter and will therefore approach the phase of the field producing that secondary E. M. F. A torque will result between the field due to $S_2$ which represents the motor field and the rotor current. This torque will however diminish rapidly with increasing speed principally because current and motor field will tend to get more and more out of phase.

The current on switching in can be regulated by means of lever K or the regulating resistance X or by varying the E. M. F. impressed on $S_2$ or in any of the well known ways. When K is on point 1 no E. M. F. at all is impressed on the rotor. The current taken by the motor and the torque will increase as K is moved toward point 4 or as X is reduced. The direction of rotation can be reversed by reversing the current through the rotor by means of Z. When the motor has nearly reached its full or synchronous speed, the supply is disconnected from $S_2$, thrown on to the slip rings by way of the switches L which are moved on to points 7, 8 and $S_1$ and $S_2$ are short-circuited by means of $K_1$ and $K_2$. As soon as synchronous speed is reached the current flowing from the rotor into F becomes continuous and can be adjusted by means of K or X or by both so as to produce that unidirectional magnetization which yields either the best mean power factor or the best power factor for a given load. When desired an adjustment can be made for every or any load but that of course is not necessary for the successful operation of the motor. When desired the motor can be made to take leading currents.

If the motor gets overloaded it can slip out of synchronism when it can continue to work as an asynchronous motor with the help of the short-circuited polyphase winding $S_1$ $S_2$ disposed on the stator. That same winding will also check any tendency of the motor to hunt when running synchronously.

It will be noted that the rotor as shown in Fig. 3 must be wound for the full line pressure for that figure indicates a simple Gramme ring winding W connected to two slip rings $R_1$ and $R_2$ and to a commutator on which rest the brushes $B_1$ and $B_2$. The pressure of the supply is often high and if the rotor winding just described were used on high voltage circuits, a high voltage would also result at the brushes $B_1$ and $B_2$; this would lead to sparking and would necessitate a great number of turns in the winding F. One way in which this difficulty can be obviated is to make use on the rotor of a combined continuous current and alternate current winding, the former being closed on itself while the latter is at one end connected to the former and at the other to slip rings as shown diagrammatically in Fig. 2 for the case of a single phase rotor winding. In this manner the voltage at the commutator will only depend on W whereas the voltage at the slip rings will depend on W, $W_1$ and $W°_1$. A rotor wound as shown in Fig. 2 will entirely do away with the sparking difficulty in normal operation and also reduce it to quite harmless proportions at starting or even entirely obviate it.

Again referring to Fig. 2 the purely alternate current part of the rotor winding, that shown at $W_1$ and $W°_1$, can be of any well known type used on alternate current machines or it can also be a continuous current winding suitably interconnected with W on one side and the slip rings on the other. In a further modification illustrated in Fig. 9 the winding $W_1$ $W°_1$ need have no electrical connection whatever with the winding W connected to the commutator.

In Fig. 4 is shown a modification in the disposition of the windings placed on the stator. The windings F and $S_2$ are here combined into one winding which at starting is connected to the supply A A at 9 and 7. Whereas in Fig. 3 the primary $S_2$ and the secondary F of the transformer in the axis of these two windings were separate they have been combined in Fig. 4 after the style of an autotransformer by means of which the tension to be applied to the armature may be as easily varied with the help of switch K as in the case of Fig. 3. When in normal operation the switch $K_2$ short-circuits that portion of the combined winding F—$S_2$ which is not made use of for excitation purposes.

In Fig. 5 is shown a single phase motor constructed according to this invention and adapted to be started as a "self-excited series induction motor". The rotor carries a combined winding such as is also shown in Fig. 2; the stator windings are disposed similarly to those of Fig. 3 but in this case it is the winding $S_1$, coaxial with the commutator brush line, which is proportioned for direct or indirect connection to the mains whereas $S_2$ may have any convenient number of turns. The winding F is connected in series with the continuous current winding W on the rotor by means of the brushes $B_1$ $B_2$. The transformer field due to $S_1$ produces at $B_1$ $B_2$ an E. M. F. which forces a current through W and F. The current in these two windings is necessarily cophasal, the field produced by F is cophasal with the current through F therefore with the current through W. The field produced by F is the motor field and produces the torque with the current in W. The maximum available torque with a given terminal voltage depends on the number of turns in $S_1$. The number of these turns can be regulated in order to secure gradual starting. The torque and the current taken by the motor for a given number of turns in $S_1$ can be regulated by means of K, torque and current being a minimum when K stands on point 1, for the reason that all the turns of F are then in circuit with the brushes $B_1$ $B_2$. The impedance of the armature circuit is thus very large and the current induced therein by $S_1$ is consequently small. A resistance at X or any other well known regulating means may be employed.

At starting in the manner shown in Fig. 5 the winding $S_2$ is on open circuit and the slip rings are not connected to the mains. When a sufficient speed has been reached the supply is disconnected from $S_1$ and connected to points 7 and 5 by way of the switches L, the windings $S_1$ $S_2$ are short-circuited by means of the switches $K_1$ $K_2$ and the winding F adjusted for instance with the help of K and X to give the desired power factor.

In this case as in all others the various changes indicated can be carried out gradually or suddenly as desired. The direction of rotation can be reversed by reversing the current through F, i. e., by reversing the motor field by means of Z.

A further means for starting a single phase motor according to this invention is shown in Fig. 6. As the connections are shown the motor will start as a "separately excited series induction motor". The winding $S_1$ and part of the combined winding F and $S_2$ are connected in series across the mains, the rotor is short-circuited in the axis of $S_1$ by means of the brushes $B_1$ $B_2$ and the switch Y through point 5. The armature current is therefore induced in the short-circuited rotor by the transformer field due to $S_1$ and the motor field is excited by the winding F—$S_2$ or that part of it which the particular position of K includes in the circuit for the time being. When the motor has reached a sufficient speed the mains are disconnected from $S_1$ and F—$S_2$ and connected to points 8 and 10 by way of the switches L at the same time $S_1$ and $S_2$ are short-circuited by $K_1$ and $K_2$ and the rotor brushes connected to a suitable amount of winding F through a regulating resistance X by throwing the switch Y on to point 6. The direction of rotation can be altered by reversing the current through F by means of Z.

In Fig. 7 is shown a motor constructed according to this invention and arranged to start partly as a "separately" and partly as a "self-excited series induction motor". The polyphase winding disposed on the stator and forming the asynchronous feature 4 is of the three phase type. The three phases are at starting all connected in series across the mains and in such a way that two of them, say $S_1$ and $S_2$ produce an alternating field in the axis $B_1$ $B_2$ whereas the third $S_3$ produces an alternating field perpendicular to $B_1$ $B_2$. At the same time the brushes $B_1$ $B_2$ are connected to F for instance as in Fig. 5, whereas the slip ring circuit is left open. It is seen that in this form of the invention the whole of the copper on the stator is active throughout.

The transformer field due to $S_1$ and $S_2$ induces a current in W which also flows through F thus part of the motor field is excited by the armature current flowing through F, this is the self-excited field. The stator current flowing through $S_3$ excites another part of the motor field. These two windings may be made to coöperate or to oppose each other, thus varying the starting torque, which can, of course, be varied by means of K and X or by any well known means. When the motor has reached a sufficient speed the mains are disconnected from $S_1$ $S_2$ $S_3$ and switched on to the slip rings at points 8 and 10 by way of the switches L at the same time all stator windings with the exception of F are short-circuited by $K_1$ $K_2$ $K_3$ when the excitation producing the unidirectional field at synchronism can be suitably adjusted as has already been fully explained. The direction of rotation can be reversed by means of the switches $Z_1$ and Z.

The motor constructed according to this invention and shown in Fig. 8 also starts as a "self-excited series induction motor" in the same manner as has for instance been more fully described in connection with Fig. 5. In this figure, however, the arrangement of the stator windings is somewhat different. The winding F is the same as in previous figures but the stator winding which is short-circuited in normal operation is by way of example carried out exactly like a three-phase star winding of very few turns of thick wire per phase. The relative position of any one phase to any of the other stator windings is immaterial. Coaxially with the brushes $B_1$ $B_2$ is disposed the starting winding $S_t$ which need only be wound with fine wire and this at starting is connected to the mains. When the motor has reached a sufficiently high speed the three phase winding $S_1$ $S_2$ $S_3$ is short-circuited by $K_2$ and $K_3$ after the mains have been disconnected from $S_t$ and connected to the slip rings at the points 8 and 10 by way of the switches L. The winding $S_t$ may or may not be short-circuited as well. The excitation at F is adjusted as in the previous examples.

In Fig. 9 is shown one scheme of connections for a motor starting and operating somewhat like the motor shown in Fig. 7. The difference is that only a two-phase winding $S_1$ $S_2$ is supposed to be used on the stator positioned as shown for instance in Fig. 5, and the rotor is supposed to carry two distinct windings. The contact arm N is shown in the "off" position O. When moved to position 1 only the stator windings are in circuit and it is not until the motor has gathered speed that the slip rings are connected to the supply. As N moves farther the tension across the slip rings increases and that across $S_1$ and $S_2$ diminishes until the latter are totally short-circuited. The torque and current can at the same time be regulated with the help of K or X or both. When $S_1$ and $S_2$ are short-circuited the starting transformer T can be disconnected from the supply for instance by opening switch M.

In Fig. 10 is shown a motor constructed according to this invention and started as a neutralized series conduction motor. The part $S_1$ of the multiphase winding on the stator always remains short-circuited, the winding $S_2$, the rotor by way of the brushes B₁ B₂, and any part of F are connected in series across the mains. After the motor has reached a sufficient speed the mains are disconnected from the windings named above and connected to the slip rings by moving the switches L from points 7 and 9 to points 8 and 10 and the switches K₂ and K₃ are closed. Switch K₂ short-circuits S₂ and K₃ connects the brushes to the winding F which can be now adjusted as previously explained.

Fig. 11 illustrates that construction of the stationary part I and the revolving part D of these machines which is essential for their satisfactory operation. This construction secures a practically constant iron cross section for the revolving fluxes set up in these machines. The stationary part I has a number of slots H in which are located the windings S₁ S₂ and F of Fig. 5 while the windings W, W₁ W°₁ are located in the slots G of the revolving part D.

The hereinbefore described machines can be employed as self-exciting generators if mechanically driven; they will operate very readily in parallel with other generators and it will not be necessary to synchronize them accurately before switching them on to the supply, the unidirectional exciting circuit being closed only after such a generator has been connected to the mains. If brought up to approximately their synchronous speed without unidirectional excitation, and connected in parallel with other generators, they will take such a wattless alternating current from the other generators as will enable the several short-circuited stator windings to produce the necessary excitation in these machines to enable them to operate as asynchronous generators when driven at sufficiently high speed. By closing the unidirectional exciting circuit, these machines may be converted into synchronous generators, in which case the several short-circuited stator windings will serve to damp out the double frequency armature reaction component.

These same machines will also operate as converters and are particularly well adapted for converting single phase into continuous current and vice versa. Single phase converters have always been very difficult to start from the alternate current side requiring a quite abnormal current for this purpose. My improved machine entirely obviates this difficulty for the various methods of starting which have been described in connection with the drawings are all very effective and will enable the machine to be brought up to speed as an alternate current motor with a fraction of its full load current. Single phase converters as ordinarily constructed are liable to "hunt" and to spark at the commutator and the design of my improved machine as herein described also does away with those difficulties because of the use of a field structure of uniform cross section all around and because of the polyphase winding on this structure. In making use of these machines for converting alternate into continuous current they can, for instance, be started like an alternating current motor in any one of the ways described in this specification, and when running synchronously alternate current being supplied to the slip-rings, continuous current can be taken from the brushes on the commutator by means of suitable leads and conveyed to any desired translating devices. When converting from continuous to alternating current the machine, of course, operates simultaneously as a continuous current motor and as an alternating current generator, the alternating current being taken from slip-rings. The essential elements comprised in my improved dynamo electric machine and enumerated in this description are made use of in all cases and whether the machine operates as an alternate current motor or generator or as a converter.

What I claim and desire to secure by Letters Patent is:—

1. In a dynamo electric machine, the combination with a source of single-phase current, of a stator provided with an exciting winding and with at least two other windings disposed along axes displaced by less than 360/n degrees, a rotor having a winding connected to slip-rings, a commutator and means for connecting it to the exciting winding, means for short-circuiting the other two stator windings, and means for connecting the source of single-phase current to one of the stator windings for starting and to the slip-rings for running.

2. In a single-phase converter, the combination with a source of single-phase current, of a stator provided with an exciting winding and with another winding displaced therefrom, means for establishing a plurality of short-circuits on the stator along different axes, a rotor having a winding connected to slip-rings, a commutator and brushes thereon, means for connecting the brushes to the exciting winding, the circuits of the machine being so arranged at starting as to cause an alternating current to be established through the rotor by way of the brushes along an axis displaced from one of the stator windings, and means for connecting the source of single-phase current to the slip rings for running.

3. In a dynamo electric machine, the combination with a source of single-phase current, of a stator provided with an exciting winding and at least two other windings displaced by less than 360/n degrees, a rotor having a commuted winding, means for connecting the commuted winding to the exciting winding, slip-rings connected to the commuted winding, means for connecting the source of single-phase current to one of the stator windings for starting and to the slip-rings for running, and means for short-circuiting two of the stator windings.

4. In a single-phase converter, the combination with a source of single-phase current, of a stator having no defined polar projections and provided with an exciting winding and another winding displaced therefrom, means for establishing a plurality of short-circuits on the stator along different axes, a rotor having a winding connected to slip-rings, a commutator and brushes thereon, and means for connecting the brushes to the exciting winding, the circuits of the machine being so arranged at starting as to cause an alternating current to be established through the brushes and also through a stator winding displaced from the brush axis, and means for connecting the source of single-phase current to the slip-rings for running.

5. In a dynamo electric machine, the combination with a source of single-phase current, of a stator provided with at least two windings disposed along axes displaced from each other by less than 360/n degrees, a rotor having a winding connected to slip-rings, a commutator, an exciting winding on the stator connected to said commutator along the axis of one or the other stator windings, means for connecting the source of single-phase current to at least one of the stator windings for starting and to the slip-rings for running, and means for short-circuiting two of the stator windings.

6. In a dynamo electric machine, the combination with a source of single-phase current, of a stator provided with an exciting winding and a second winding disposed along an axis displaced by less than 360/n degrees from the exciting winding, a rotor having a winding connected to slip-rings, a commutator with brushes thereon, means for connecting the brushes to the exciting winding, means for connecting the source of single-phase current to one of the stator windings for starting and to the slip-rings for running, and means for establishing a plurality of short-circuits on the stator along different axes.

7. In a dynamo electric machine, the combination with a source of alternating current, of a stator provided with an exciting winding and at least two other windings displaced from each other by less than 360/n degrees, means for short-circuiting said two last named windings, a rotor having slip-rings and a commuted winding, means for connecting the commuted winding to the exciting winding, an additional winding on the rotor connected to a slip-ring, and means for connecting the source of alternating current to one of the stator windings for starting and to a slip-ring for running.

8. In a dynamo electric machine, a stator provided with an exciting winding and two windings displaced from each other, means for short-circuiting said two last named windings, a rotor having slip-rings, a commuted winding, and an additional winding connected to the commuted winding and to a slip-ring.

9. In a dynamo electric machine, the combination with a stationary member without defined polar projections and provided with an exciting winding and at least two other windings disposed along axes displaced from each other by less than 360/n degrees, of a revolving member without defined polar projections having a commuted winding, means for connecting the commuted winding to the exciting winding, slip-rings, and an additional winding connected to the commuted winding and to a slip-ring, and means for short-circuiting two of the stator windings.

10. In a single-phase converter, the combination with a source of current, of a stationary member without defined polar projections and provided with two windings displaced from each other by less than 360/n degrees, means for short-circuiting said windings, a revolving member without defined polar projections having a commutator and a winding connected to slip-rings, an exciting winding on the stationary member connected to the commutator, and means for connecting the source of current to a winding on the stationary member for the purpose of starting the converter.

In witness whereof, I have hereunto signed my name in the presence of two subscribing witnesses.

VALÈRE ALFRED FYNN.

Witnesses:
ROBERT MILTON SPEARPOINT,
H. D. JAMESON.